United States Patent [19]

Droste et al.

[11] Patent Number: 5,865,411
[45] Date of Patent: *Feb. 2, 1999

[54] REMOVABLE DEVICE FOR HOLDING BEVERAGE CONTAINERS, DRINKING VESSELS OR THE LIKE, ESPECIALLY IN MOTOR VEHICLES

[75] Inventors: Hans Droste, Leonberg; Wolfgang Moebius, Schwieberdingen; Leo Macho, Tiefenbronn, all of Germany

[73] Assignee: Ing. h.c.F. Porsche AG, Weissach, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 814,765

[22] Filed: Mar. 10, 1997

[30] Foreign Application Priority Data

Mar. 8, 1996 [DE] Germany .................. 196 09 022.9

[51] Int. Cl.⁶ ...................................... A47K 1/08
[52] U.S. Cl. .......................... 248/311.2; 224/926
[58] Field of Search ............... 248/311.2, 309.1; 224/926

[56] References Cited

U.S. PATENT DOCUMENTS 3,186,671   6/1965   Standley .
5,072,909  12/1991   Huang ................... 248/311.2
5,092,395   3/1992   Amidzich ........... 248/311.2 X
5,165,646  11/1992   Gewecke .............. 248/311.2
5,191,679   3/1993   Harper ............... 248/311.2 X
5,328,143   7/1994   Koorey et al. ........ 224/926 X
5,423,508   6/1995   Isenga et al. ........ 248/311.2
5,445,350   8/1995   Rigsby .............. 248/311.2 X
5,489,055   2/1996   Levy ................ 248/311.2 X
5,540,409   7/1996   Cunningham .......... 248/311.2
5,603,477   2/1997   Deutsch ............. 248/311.2

FOREIGN PATENT DOCUMENTS 90 06 623.5   9/1990   Germany .
WO 95/07194   3/1995   WIPO .

*Primary Examiner*—Ramon O. Ramirez
*Attorney, Agent, or Firm*—Evenson, McKeown, Edwards & Lenahan, P.L.L.C.

[57] ABSTRACT

A removable device for holding beverage containers, drinking vessels, or the like, especially in motor vehicles, includes a lower support part, a receiving element located higher up with a fastening component connected thereto, and at least one connecting arm extending between the support part and the receiving element. In order for the device, which exhibits good function and simple operation, to be storable compactly in the motor vehicle when not in use, provision is made such that the connecting arm and support part are made foldable and movable from an unfolded use position into a folded lowered resting position within the receiving element.

20 Claims, 3 Drawing Sheets

REMOVABLE DEVICE FOR HOLDING BEVERAGE CONTAINERS, DRINKING VESSELS OR THE LIKE, ESPECIALLY IN MOTOR VEHICLES

BACKGROUND AND SUMMARY OF THE INVENTION

The invention relates to a removable device for holding beverage containers, drinking vessels, or the like, especially in motor vehicles.

This application claims the priority of German Patent Application 196 09 022.9 filed in Germany on Mar. 8, 1996, the disclosure of which is expressly incorporated by reference herein.

U.S. Pat. No. 3,186,671 teaches a removable device for holding beverage containers, drinking vessels, or the like, said device being formed by a bent wire loop structure. An upwardly projecting loop-shaped fastening component is connected to one side of the partially-annular upper receiving element, while upright, downwardly-directed connecting arms are connected to the other side of said element, with the connecting arms being made integral with the receiving element and the support part.

This system suffers from the disadvantage that a rattle-free accommodation of containers with different outside diameters is difficult to achieve and the device, when removed, requires a relatively large storage space in the vehicle because of its one-piece design.

A goal of the invention is to improve a removable device for holding beverage containers, drinking vessels, or the like, especially in motor vehicles, such that in addition to exhibiting good function and simple operation, it can be stored compactly in the motor vehicle when not in use. In addition, containers with different outside diameters should be capable of being accommodated without rattling.

This and other goals have been achieved according to the present invention by providing a removable device for holding a container in a vehicle, comprising: a receiving element having an inner periphery defining an opening; a connecting arm having a first end and a second end, said first end being mounted to the receiving element; and a lower support part which is mounted to said second end of the connecting arm, said connecting arm and said lower support part being movable between an unfolded use position in which the connecting arm and the lower support part are arranged below the receiving element, and a folded storage position in which the connecting arm and the lower support part are arranged in said opening of the receiving element.

A primary advantage achieved by the present invention is that the foldable design of the connecting arm and support part produce a device for holding beverage containers, drinking vessels, or the like that is movable rapidly and easily from an unfolded use position into a folded lowered resting position within the receiving element, with the device forming a compact part in the resting position that can be accommodated compactly in the vehicle, for example in a door pocket or in the glove compartment.

The device consists of few parts and can be manufactured simply and economically. The individual parts are preferably made of plastic. Flexible clamping elements provided on the inside of the at least partially annular receiving element ensure that containers with different outside diameters can be accommodated in the device without rattling.

When the device is folded up, the support part, aligned approximately horizontally, is folded up onto the upright connecting arm and then the connecting arm and support part are moved jointly into a lowered resting position within the receiving element.

The connecting arm and support part, viewed heightwise, in the folded resting position lie approximately flush with the outer surface of the receiving element, in other words they do not project at either the top or bottom from the receiving element.

Catches can be provided in the vicinity of the joints between the receiving element and connecting arm on the one hand and between the connecting arm and the support part on the other, said catches determining the position of the support part and the connecting arm in the unfolded use position.

Other objects, advantages and novel features of the present invention will become apparent from the following detailed description of the invention when considered in conjunction with the accompanying drawings.

DETAILED DESCRIPTION OF THE DRAWINGS

Figure 1:
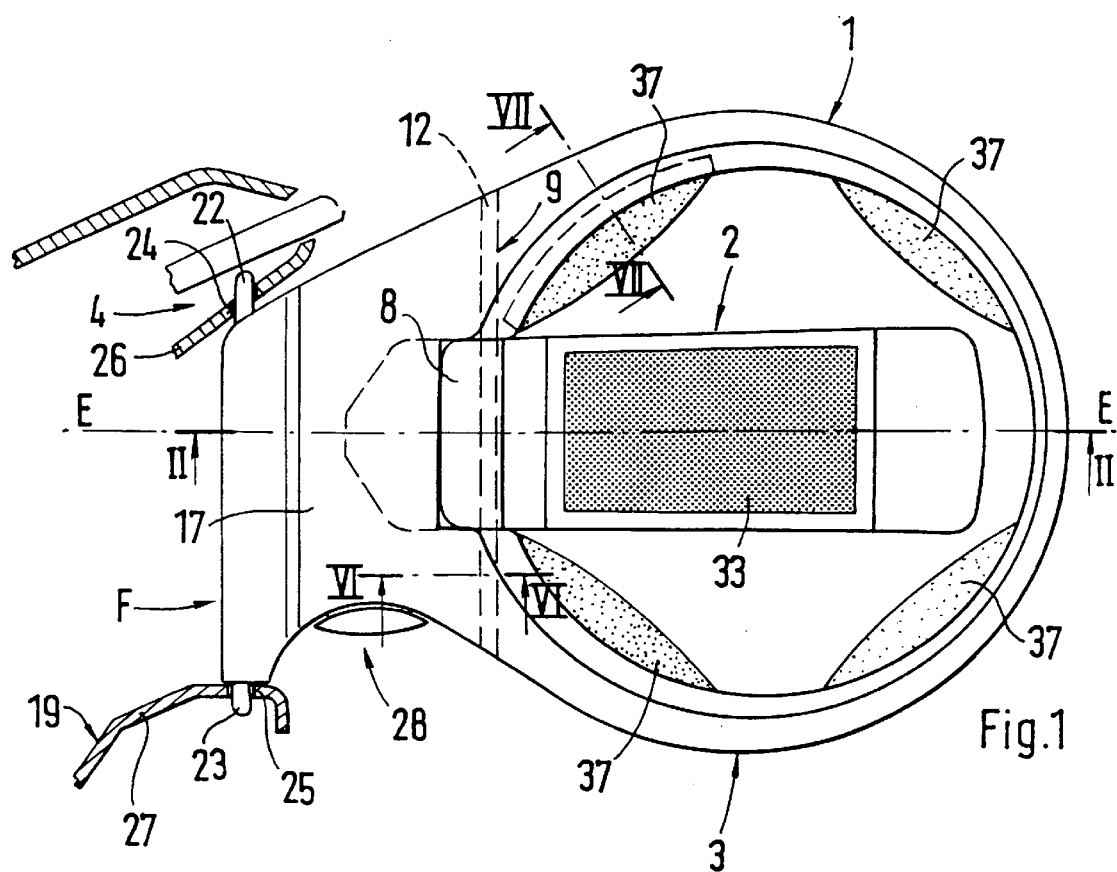
FIG. 1 is a top, partially sectional view, of a removable device for holding beverage containers, drinking vessels, or the like, especially in motor vehicles, according to a preferred embodiment of the present invention.

A removable device 1 for holding beverage containers, drinking vessels such as coffee cups, soda cans or the like, in motor vehicles, boats, aircraft, and especially in motor vehicles comprises a lower support part 2, a receiving element 3 located higher up, with a mounting element 4 connected thereto as well as at least one connecting arm 5 extending between support part 2 and receiving element 3. Container 6 received by device 1 rests on lower support part 2 and is held laterally by receiving element 3.

Figure 2:
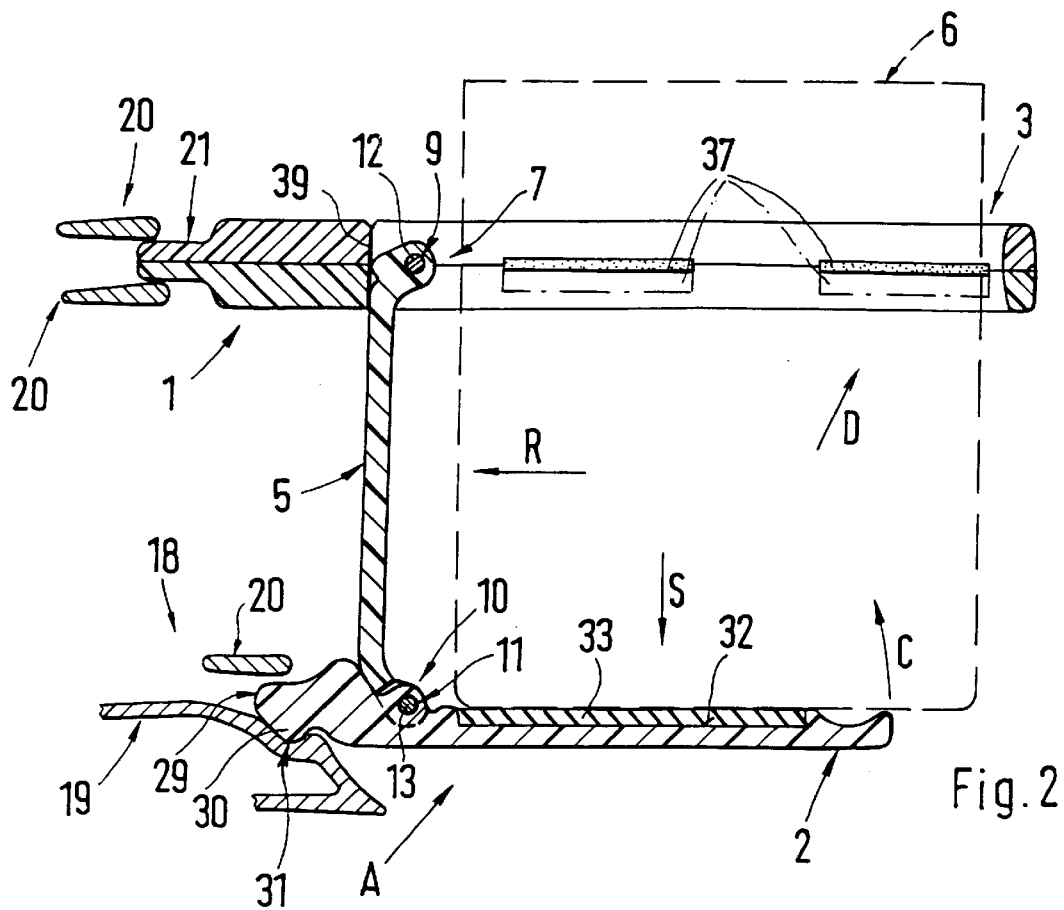
FIG. 2 is a sectional view taken along line II—II in FIG. 1, with the device being shown in the unfolded use position.
Figure 3:
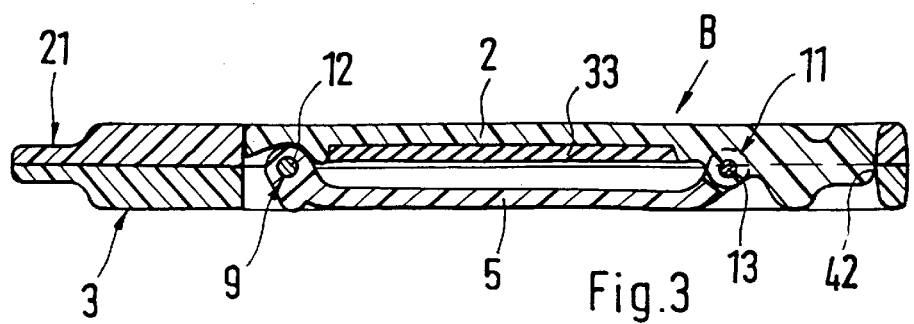
FIG. 3 is a sectional view similar to that in FIG. 2, showing the device in the folded resting position.

According to the invention, connecting arm 5 and support part 2 are made to be foldable and movable from an unfolded use position A (see FIG. 2) into a folded storage position B within receiving element 3 (see FIG. 3).

An upper end 7 of connecting arm 5 is connected in the vicinity of a niche-shaped recess 8 of the at least partially annular receiving element 3 by a first transverse articulated connection 9 to receiving element 3, while a lower end 10 of connecting arm 5 cooperates with support part 2 by means of a second transverse articulated connection 11.

Connecting arm 5 and support part 2 in the embodiment are formed by narrow strip-shaped parts made of plastic, with both parts being symmetrical to a plane E—E.

The first articulated connection 9 comprises a pin 12 running approximately at a right angle to plane E—E, said pin being guided through corresponding openings in receiving element 3 and connecting arm 5. Pin 12 forms a transverse axis of rotation for foldable connecting arm 5.

The clamping eye injection-molded in the center is intended to stabilize connecting arm 5 in the unfolded use position A.

The second articulated connection 11 is formed by another pivot pin 13 that passes through molded bearing eyes on connecting arm 5 and support part 2.

In the illustrated embodiment, two laterally external bearing eyes 14, 15 with through holes are provided on connecting arm 5, while central bearing eye 16 is made integral with support part 2. Central bearing eye 16 also has a through bore to allow hinge pin 13 to pass through (see FIGS. 4 and 5).

In use position A, upper receiving element 3 is aligned in an approximately horizontal position, connecting arm 5 extends downward in the vertical direction from pin 12, and support part 2 is positioned beneath and approximately parallel to receiving element 3, extending from the lower end 10 of connecting arm 5.

Receiving element 3 is provided with a molding 17 on the side that faces the niche-shaped recess 8, said molding running as a lateral extension of receiving element 3 and being flush therewith. In the vicinity of molding 17, mounting elements 4 are provided which in the embodiment comprise axially displaceable spring-loaded bearing pins 22, 23. Referring to FIGS. 1 and 2, device 1 is held removably in place on an air outlet 18 located on the dashboard of the motor vehicle, with air outlet 18 being formed for example by a side outlet through which cold air and/or warm air can be conducted into the passenger compartment. The air outlet comprises an outer housing 19 and several blades 20.

According to FIG. 2, a tapered end area 21 of plate-shaped molding 17 projects into the space between two blades 20, located one above the other, of the adjoining air outlet 18 and is supported therein. In addition, two axially displaceable spring-loaded bearing pins 22, 23 are provided on tapered end area 21 of molding 17. The pins 22, 23 in the locking position F of device 1 (see FIG. 1) are guided through corresponding openings 24, 25 of side walls 26, 27 of housing 19 of air outlet 18, where said walls 26, 27 project in part.

At least one bearing pin, for example 23, cooperates in the embodiment with a push button 28, with bearing pin 23 being moved inward by operation of push button 28 so that it becomes disengaged from opening 26 or lateral wall 27 (release position) and device 1 can be removed.

The two bearing pins 22, 23 are aligned approximately horizontally and extend in a direction crosswise to the vehicle. According to FIG. 1, the two bearing pins 22, 23 are made coaxial with one another. Bearing pins 22, 23 however can also extend at an angle to one another (not shown).

Support part 2 either abuts portions of an adjoining housing 19 located beneath by means of a shaped end area 29, or a positive connection is provided between housing 19 and support part 2.

According to FIG. 2, a nose-shaped projection 30 of support part 2 projects into a corresponding groove 31 in housing 19.

Support part 2 has a downwardly directed indentation 32 in a central area, into which indentation an insert 33 fits. Insert part 33 made of rubber or the like is provided on the side facing container 6 located above with a pebbled surface to keep container 6 from slipping. Receiving element 3 has an annular shape as shown in FIG. 1.

Figure 6:
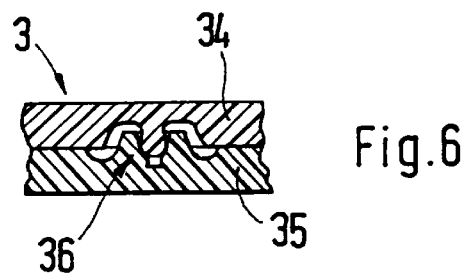
FIG. 6 is a sectional view taken along line VI—VI in FIG. 1.
Figure 7:
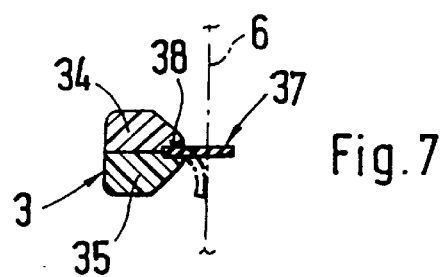
FIG. 7 is a sectional view taken along line VII—VII in FIG. 1.

Referring to FIGS. 6 and 7, a receiving element 3 consists of a top part 34 and a bottom part 35 connected together by a clip connection 36. In order for containers 6 of different outside diameters to be receivable in a rattle-free manner by device 1, flexible clamping elements 37 are provided on an inner periphery of receiving element 3 facing container 6, said elements 37 abutting container 6 at least locally. Clamping elements 37 can be connected by gluing, injection, or by fastening with a clamp or the like to receiving element 3.

FIG. 7 shows a clamp mount 38 in the form of a circular recess for clamping element 37, with clamping element 37 being held in position areawise between top part 34 and bottom part 36 of receiving element 3. Clamping elements 37, made of rubber, plastic, or the like, abut container 6 that has been inserted, externally with deformation. Four clamping elements 37 are provided on the inside of circular recess 38 of receiving element 3, said elements however being capable of being combined into a one-piece annular element.

Referring to FIG. 2, in use position A, upright connecting arm 5 abuts an adjoining wall area 39 of niche-shaped recess 8 that runs in the same direction, and remains there in an end stop position. The position of support part 2 in use position A of device 1 is established by the positive connection between support part 2 and housing 19 and/or a catch between support part 2 and connecting arm 5.

Figure 4:
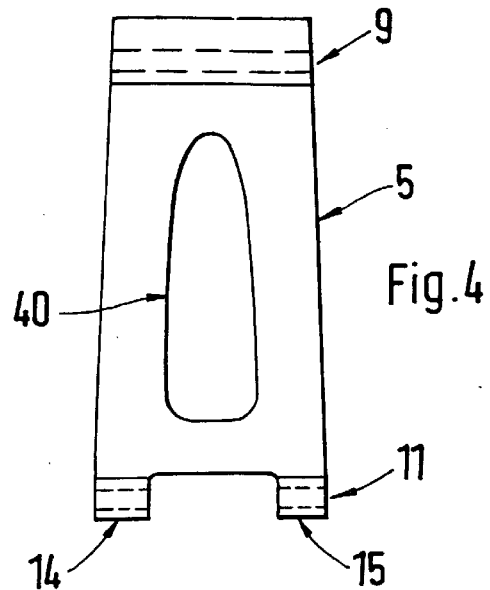
FIG. 4 is a view looking in the direction of arrow R in FIG. 2 of the upright connecting arm.

According to FIG. 4, connecting arm 5 tapers inwardly slightly from bottom to top and has a slot-shaped opening 40 in a central area of its transverse extent, through which opening air from air nozzle 18 can flow toward container 6.

Figure 5:
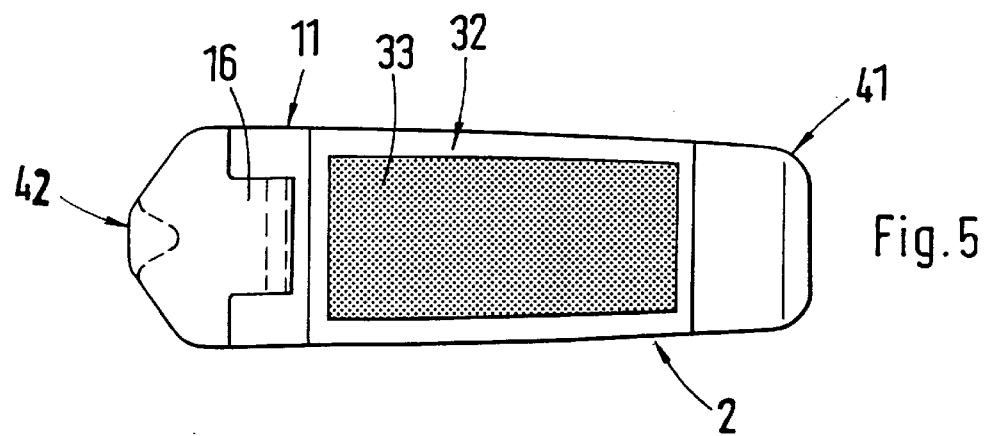
FIG. 5 is a view looking in the direction of arrow S in FIG. 2 of the support part and connecting arm.

Referring to FIG. 5, support part 2 has a slightly larger width in the vicinity of second articulated connection 11 than at free end 41. Referring to FIG. 2, when device 1 is folded up, support part 2 is pivoted by a first pivoting process (direction of arrow C) around the rotational axis formed by pivot pin 13 against upright connecting arm 5, and then moved together with the upright connecting arm 5 by a second pivoting process (direction of arrow D) in order to rotate about the rotational axis formed by pin 12 into folded storage position B within receiving element 3.

In folded storage position B, support part 2 and connecting arm 5 are flush with the surfaces of the upper and lower contours of receiving element 3 and form a narrow folded package that can be accommodated in a door pocket or in the glove compartment for example.

Referring to FIG. 3, in folded storage position B of device 1, a narrow marginal area 42 of support part 2 which has been folded upward performs a supporting action (frictional engagement) with the inside of recess 38 of receiving element 3, producing a rattle-free mount for raised support part 2 and connecting arm 5.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A removable device for holding a container in a vehicle, comprising:

a receiving element having an inner periphery defining an opening;

a connecting arm having a first end and a second end, said first end being mounted to the receiving element; and a lower support part which is mounted to said second end of the connecting arm, said connecting arm and said lower support part being movable between an unfolded use position in which the connecting arm and the lower support part are arranged below the receiving element, and a folded storage position in which the connecting arm and the lower support part are received within said opening of the receiving element.

2. A device according to claim 1, wherein said receiving element is at least partially annular and said inner periphery further defines a niche-shaped recess, said first end of the connecting arm being connected to said receiving element proximate said niche-shaped recess by a first transverse articulated connection, and said second end of the connecting arm being connected to the support part by a second transverse articulated connection.

3. A device according to claim 2, wherein said receiving element is provided with a molding adjacent to said niche-shaped recess, said molding carrying a mounting element, said molding extending as a lateral extension of the receiving element.

4. A device according to claim 2, wherein said device is adapted to be removably mounted on an air outlet located on a dashboard of the vehicle.

5. A device according to claim 1, wherein said receiving element is provided with a molding adjacent to said niche-shaped recess, said molding carrying a mounting element, said molding extending as a lateral extension of the receiving element.

6. A device according to claim 5, wherein said device is adapted to be removably mounted on an air outlet located on a dashboard of the vehicle.

7. A device according to claim 6, wherein the molding is provided with a tapered end area to be projected into a space between two spaced blades of the air outlet and to be supported by said blades.

8. A device according to claim 1, wherein said device is adapted to be removably mounted on an air outlet located on a dashboard of the vehicle.

9. A device according to claim 8, wherein said receiving element is provided with two spring-loaded projecting bearing pins to be fastened to fixed lateral walls of a housing of the air outlet.

10. A device according to claim 9, wherein at least one of said bearing pins is operably movable via a push button from a locked position into a release position.

11. A device according to claim 8, wherein said support part includes a nose-shaped projection to be disposed in a groove in a housing of the air outlet in the unfolded use position.

12. A device according to claim 1, wherein a plurality of flexible clamping elements are provided on said inner periphery of the receiving element, in order to hold containers of varying diameter.

13. A device according to claim 1, wherein said support part and said connecting arm are each formed by a narrow strip-shaped part made of plastic, the support part and the connecting arm extending symmetrically relative to a plane which bisects said receiving element.

14. A device according to claim 13, wherein said support part is provided with an insert part with a frictional surface.

15. A device according to claim 1, wherein said support part is pivotable onto said connecting arm about a first pivot point and is pivotable together with the connecting arm about a second pivot point into the folded storage position.

16. A device according to claim 1, wherein in said folded storage position, the connecting arm and the lower support part are completely contained within said opening of the receiving element.

17. A removable device for holding a container in a vehicle, comprising:

a receiving element having an inner periphery defining an opening which receives a container;

a connecting arm having a first end and a second end, said first end being rotatably mounted to the receiving element; and a lower support part which is rotatably mounted to said second end of the connecting arm, said connecting arm and said lower support part being movable between an unfolded use position in which the connecting arm extends downwardly from said receiving element and the lower support part is arranged below said opening of the receiving element, and a folded storage position in which the connecting arm and the lower support part are received within said opening of the receiving element.

18. A device according to claim 17, wherein said receiving element further comprises a tapered end area which is engageable with at least two blades of an air outlet of the vehicle.

19. A device according to claim 17, wherein said lower support part comprises a projection for supporting engagement with a fixed structure of the vehicle located below said at least two blades.

20. A device according to claim 17, wherein in said folded storage position, the connecting arm and the lower support part are completely contained within said opening of the receiving element.

* * * * *